(No Model.)

M. E. ANDERSON.
WHEEL FOR BICYCLES.

No. 587,357. Patented Aug. 3, 1897.

WITNESSES
A. B. Driggs
C. J. Stockman

INVENTOR
Martin E. Anderson
by H. H. Bunyea
Attorney

UNITED STATES PATENT OFFICE.

MARTIN E. ANDERSON, OF DE KALB, ILLINOIS.

WHEEL FOR BICYCLES.

SPECIFICATION forming part of Letters Patent No. 587,357, dated August 3, 1897.

Application filed March 1, 1897. Serial No. 625,543. (No model.)

*To all whom it may concern:*

Be it known that I, MARTIN E. ANDERSON, a citizen of the United States, residing at De Kalb, in the county of De Kalb and State of Illinois, have invented certain new and useful Improvements in Wheels for Bicycles and other Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention has relation to wheels more particularly adapted to bicycles having yielding rims or tires, the object being to provide a simple, cheap, and practical device having the advantages of the cushion or pneumatic tires without the disadvantages thereof.

To this end the invention consists in the peculiarities of construction hereinafter described, and particularly set forth in the claim.

Figure 1:
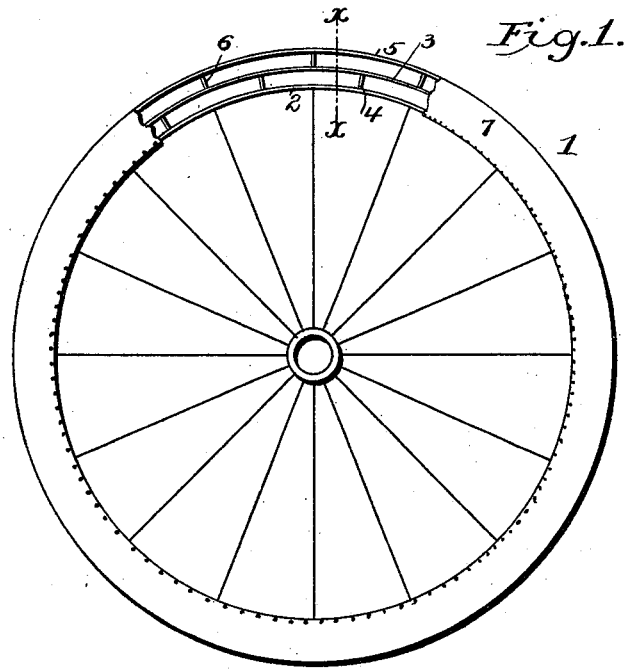
Figure 2:
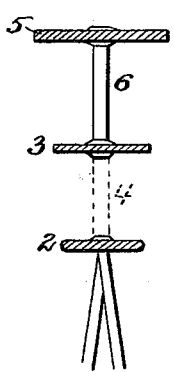
Figure 3:
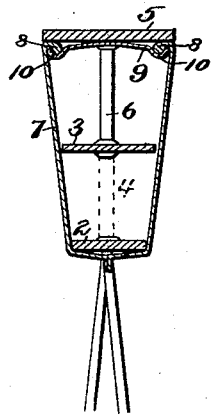
Figure 4:
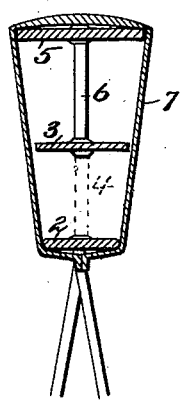

In the accompanying drawings, illustrating the invention, Figure 1 is a side view of a wheel provided with my improvement with a part of the dust guard or protector broken away. Fig. 2 is a section through $x$ $x$ of Fig. 1, showing the relative size of the felly and spring-rings. Fig. 3 is a sectional view showing the preferred means of attaching the dust-guard to the outer ring. Fig. 4 is a similar view showing a modified construction of dust-guard.

The same numerals of reference indicate the same parts in the several figures.

1 designates the main portion of the wheel, having a rim or felly 2 of any suitable construction.

3 designates a ring made of spring metal, which encircles said rim or felly 2 and is connected therewith by posts 4, preferably located one between each pair of the spokes of the wheel, as shown in Fig. 1. This ring 3 is itself preferably encircled by a spring-ring 5, located at a slight distance therefrom and connected therewith by the posts 6, alternating in respect to arrangement with said posts 4. These spring rims or tires are made of highly-flexible metal, and the particular relative location of the same, together with the specified arrangement of the posts or rivets, produces a wheel in which the elasticity is equally distributed throughout and which has all the advantage of one provided with a cushion or pneumatic tire without the disadvantages thereof. To aid in the proper distribution of the cushion effect of the wheel, I prefer to make the spring tires or rims of varying sizes with respect to the felly and each other—that is to say, the inner ring or tire is preferably wider than the felly, but narrower and lighter than the outer ring or tire, as shown in Fig. 2.

Although I prefer to use two rings, I do not wish to be understood as limiting myself to any particular number thereof.

In order to guard against the admission of dust, dirt, or other foreign material within the rings, the latter are provided with a covering 7. This covering is preferably made in two parts, each having a welt 8 at one edge, as shown in Fig. 3, and the outer ends of the posts or rivets 6 adjacent to the inner surface of the outer ring or tire are provided with spring fastening devices 9, which have hooked-shaped ends 10, that engage said welts and clamp the outer edges of the protectors removably to said outer rings or tires, while the inner edges of said protectors are laced or otherwise suitably fastened together adjacent to the felly 2. If preferred, however, the protector or coverer may be made of a single piece of material extending across the tread of the outer ring and having its ends secured together adjacent to the felly of the wheel, as shown in Fig. 4. This protector is preferably made of stout canvas.

Having thus described my invention, what I believe to be new, and desire to secure by Letters Patent, is—

The combination with the wheel, having a spring-rim encircling its felly, at a distance therefrom, and connected therewith, of spring-clamps around at intervals along the under surface of said rim and extending transversely thereof, each of said clamps being attached at its center and formed with free hook-shaped ends, and a flexible guard extending around the wheel and covering the space between said felly and rim, said guard having welts along its longitudinal edges engaged with said hook ends of the spring-clamps and detachably held thereby, substantially as described.

In testimony whereof I affix my signature in presence of two witnesses.

MARTIN E. ANDERSON.

Witnesses:
CHAS. A. ANDERSON,
LAWRENCE J. McEVOY.